Patented Mar. 24, 1953

2,632,735

UNITED STATES PATENT OFFICE 2,632,735

LUBRICATING OIL ADDITIVES

Roger S. Hawley, Linden, N. J., assignor to Standard Oil Development Company, a corporation of Delaware No Drawing. Application March 1, 1951,
Serial No. 213,465

11 Claims. (Cl. 252—48.4)

This invention relates to lubricating oil additives and particularly to lubricant compositions containing a lubricant additive suitable for imparting extreme pressure or load carrying properties to the composition. A primary object of the invention is the preparation of an extreme pressure agent including sulfur and chlorine in the molecule by reacting a trichloroacetyl halide and a mercapto carboxylic ester or a metal salt thereof to form a reaction product having exceptional properties under heavy load conditions.

It is known that most ordinary mineral base lubricants and greases employed for lubricating opposed metal surfaces are likely to fail under extremely heavy load conditions. This phenomenon has been found to be particularly true in the case of machine elements such as hypoid gears frequently used in automotive vehicles since such gears are subjected at times to extremely heavy pressures under either gradual or shock loading conditions. If the lubricating oil film under these conditions fails and the metal surfaces contact each other directly, generating high temperatures due to friction, seizure or excessive wear with resulting failure of the metal parts is likely to occur. Mineral oils compounded with compounds including elements such as sulfur, chlorine and phosphorus have highly desirable properties under heavy load conditions since these elements apparently react with the metal surfaces at high temperatures forming a protective film which tends to prevent direct contact and seizure of the metal parts. The present invention contemplates a lubricant additive, including both chlorine and sulfur in a reactive form, which, when compounded with lubricating oils such as mineral base oils and other hydrocarbon lubricants, imparts to these the desirable characteristics mentioned above.

It has been found that lubricant compositions comprising a minor amount of a compound prepared by reacting a trichloroacetyl halide and a mercapto carboxylic ester or a metal salt thereof forms a product having unusual properties under extreme pressure conditions. In carrying out the reaction, the halide may be added directly to the mercapto compound or to a solution of the latter in a solvent such as benzene, the solvent being substantially inert to the halide compound. Preferably approximately equimolar concentrations of the halide and ester are used in forming the reaction product.

The reaction proceeds substantially in accordance with the following equation:

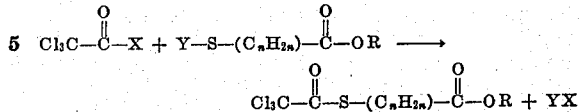

wherein X is a halide such as chlorine, bromine and the like, Y is selected from the class consisting of hydrogen and a metal, $n$ is a number and R is a hydrocarbon radical such as the alkyl, aryl, aralkyl or alkaryl radicals. The trichloroacetyl halide is preferably trichloroacetyl chloride because of the commercial availability and relative cheapness of this compound. Although bromine is considered to have some extreme pressure properties, it is usually less effective than chlorine and for this reason the substitution of chlorine rather than bromine on the methyl radical is much to be preferred. It is noted that the trichloromethyl group in the finished compound is adjacent a carbonyl oxygen, and it appears that one reason for the effectiveness of the compound as an extreme pressure additive is due to the activational influence of the carbonyl group on the chlorine radicals.

Y is preferably hydrogen. $n$ is from 1 to 4, thus forming a compound in which the thioether group is separated from the carbonyl group of the carboxyl ester radical by at least one carbon atom. The presence of the ($C_nH_{2n}$) radical tends to increase the solubility of the reaction product in oil. On the other hand, it is not desirable for $n$ to be sufficiently high to reduce to too great an extent the concentration of sulfur and chlorine in the product and thereby reduce the effectiveness of the additive.

The hydrocarbon radical, R, preferably has no more than 14 carbon atoms, since higher molecular weight radicals while promoting the solubility of the additive in oil, tend to decrease the concentration of sulfur and chlorine in the compound and thereby likewise will reduce the effectiveness of the additive as an extreme pressure agent. Suitable aryl groups include phenyl and naphthyl; the benzyl group is representative of the aralkyl radicals. The alkaryl radicals include those corresponding to toluene, isopropyl benzene, tertiary amyl benzene, octyl benzene and the like. Alkyl radicals are generally preferred and include the methyl, ethyl, propyl, butyl, octyl, and higher molecular weight radicals.

Mercapto carboxylic esters such as the esters of thioglycolic acid, alpha-mercapto propionic acid, alpha-mercapto butyric acid, alpha-mercapto isobutyric acid, or the like, and their salts are contemplated for use in making the product of the present invention.

In this connection, the ester group is added to the carboxyl radical prior to the reaction of the mercapto compound and the trichloroacetyl halide. This is an important step in the production of the additive, since mercapto carboxylic acids are dibasic in character, and the presence of the active hydrogen in the carboxyl group during the reaction would increase the possibility of this hydrogen reacting with the halide forming undesirable side reaction products.

The invention will be more fully understood by referring to the following example: 84.11 g. (0.7 mol) of ethyl thioglycolate were placed in a 500 cc., 3-necked flask fitted with a stirrer, thermometer, and dropping funnel. 127.3 g. (0.70 mol) of trichloroacetyl chloride were added to the thioglycolate with stirring over a period of about 30 minutes, while the temperature of the reactants was maintained below 30° C. An ice-water bath was employed but very little cooling was required. After the addition of the chloride was completed, the reaction mixture was stirred for about 4 hours; HCl gas evolved copiously from the reaction mixture. The mixture was then allowed to stand for approximately 12 hours; a reflux condenser was attached to the flask and the material was heated to about 155° C. Little refluxing of trichloroacetyl chloride occurred and the refluxing was discontinued after 10 minutes. The product was placed in a separatory funnel, admixed with diethyl ether, water washed about four times, neutralized with sodium bicarbonate solution and the diethyl ether extract was subsequently dried with anhydrous sodium sulfate. The material was filtered and ether was evaporated therefrom by means of a steam bath. 170.5 g. of light, straw-colored, clear liquid was obtained. The liquid was distilled in a Claisen flask at reduced pressure. 11 g. of light ends were collected at a temperature of from 40° to 120° C. (bath temperature 148–150° C.) at a pressure of 2 mm. of mercury. 150 g. of the main product was collected at 122–123° C. (bath temperature 147–151° C.) at a pressure of 2 mm. of mercury. Less than 10 g. of bottoms was left. The compound, believed to be trichloroacetyl ethyl acetate sulfide, was analyzed and the analysis compared with the theoretical contents of the elements in the product. The data are shown below:

*Analysis*

|  | Percent C | Percent H$_2$ | Percent S | Percent Cl$_2$ |
| --- | --- | --- | --- | --- |
| Theoretical | 27.14 | 2.66 | 12.07 | 40.06 |
| Found | 27.23 | 3.14 | 12.32 | 39.33 |

It is seen in view of the above results that the compound is substantially trichloroacetyl ethyl acetate sulfide. Almen machine values were obtained on a 6% blend of the substantially pure compound in a conventional refined, Coastal naphthenic oil of approximately 38 seconds Saybolt viscosity at 210° F., and 15 weights were obtained on both gradual loading and shock loading as compared to 3–5 weights for the oil per se.

The compound was further tested by admixing 10% of it with 90% of a blend comprising 53 weight percent of an acid-treated, Coastal lubricant distillate having a Saybolt viscosity at 210° F. of about 50 and 47 weight percent of a propane-deasphalted and dewaxed Mid-Continent residuum having a Saybolt viscosity at 210° F. of about 128. The resulting composition was subjected to an SAE machine test carried out at 750 R. P. M. on the main shaft, 14.6 to 1 slip ratio, and 7.9 lbs. per second loading rate. The material was found to give a rating of 450+ scale pounds which was the limit of the particular machine employed, and is considered an excellent rating for an extreme pressure lubricant, since the oil per se had a rating of 70 scale lbs.

The additives of the present invention are usually added to oils in amounts ranging from 0.1 to 20 weight percent although quantites in the range of from about 5 to 12% are usually preferred. It is to be understood that the lubricants comprising the additive described and claimed herein may, and under certain conditions should, include corrosion inhibitors, detergents, viscosity index improvers and other types of additives as will be obvious to those skilled in the art.

The additives of the type referred to above may be added to various types of lubricating oils. Such oils include the relatively light oils such as those used in automotive engines and in such cases may improve the oxidation stability of the finished composition. However, the additives of the present invention are most useful in heavier oils such as those of the SAE 80, SAE 90, or SAE 140 grades for lubrication of hypoid gears and the like where extreme pressure properties are desired. The additives may also be used in synthetic lubricants such as those of the ester type and of the polyether type, in cutting oils and, of course, in soluble cutting oils in which sodium sulfonates or other emulsifying agents have been compounded.

The additive may be added to oils by the consumer according to his needs and may be marketed as the substantially pure compound or in 10% to 80% solutions in mineral oil of the appropriate grade. Mineral lubricants having viscosities between 35 S. S. U. and 1000 S. S. U. at 210° F. are preferred.

What is claimed is:

1. An additive material for lubricants having the following formula—

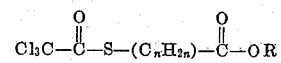

wherein $n$ is from 1 to 4 and R is a hydrocarbon radical.

2. An additive material for lubricants as in claim 1 wherein $n$ is 1.

3. An additive material for lubricants as in claim 1 wherein R is an alkyl radical.

4. An additive material for lubricants as in claim 3 wherein said radical is an ethyl group.

5. An additive material for lubricants as in claim 1 comprising trichloroacetyl ethyl acetate sulfide.

6. A composition consisting essentially of a mineral oil base stock containing an additive material having the following formula—

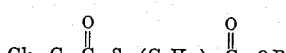

wherein $n$ is from 1 to 4 and R is a hydrocarbon radical, said additive being present in an amount in the range of about 0.1 to 20% by weight, based on said composition.

7. A composition as in claim 6 wherein R is an alkyl radical.

8. A composition as in claim 7 wherein said radical is an ethyl group.

9. A composition as in claim 6 consisting essentially of a lubricating oil base stock and in admixture therewith from 0.1 to 20% of said additive material.

10. A composition consisting essentially of a hydrocarbon oil base stock and in admixture therewith from 0.1 to 20% of trichloroacetyl ethyl acetate sulfide.

11. A composition as in claim 6 containing from 5 to 12% of said additive.

ROGER S. HAWLEY.

REFERENCES CITED

The following references are of record in the file of this patent:

UNITED STATES PATENTS

| Number | Name | Date |
| --- | --- | --- |
| 2,378,535 | Brubaker | June 19, 1945 |
| 2,381,483 | Blake et al. | Aug. 7, 1945 |
| 2,417,088 | Prutton | Mar. 11, 1947 |
| 2,422,769 | Blake et al. | June 24, 1947 |
| 2,488,253 | Woodruff | Nov. 15, 1949 |